United States Patent [19]

Rowe

[11] 4,229,975
[45] Oct. 28, 1980

[54] THROWAWAY PLASTIC THERMOMETER STRUCTURE

[76] Inventor: Charles L. Rowe, 787 E. Illinois Rd., Lake Forest, Ill. 60045

[21] Appl. No.: 40,489

[22] Filed: May 21, 1979

[51] Int. Cl.$^3$ .......................... G01K 5/08; G01K 5/22
[52] U.S. Cl. ...................................... 73/371; 73/374; 128/736
[58] Field of Search .................. 73/371, 372, 374; 128/736

[56] References Cited

U.S. PATENT DOCUMENTS

| | | | |
|---|---|---|---|
| 1,321,743 | 11/1919 | Hillenbrand | 73/371 |
| 2,651,203 | 9/1953 | Lamb | 73/374 |
| 2,677,965 | 5/1954 | Saffir | 73/372 |
| 2,712,237 | 7/1955 | Margolis | 73/371 |
| 3,490,287 | 1/1970 | Coben | 73/371 |
| 4,108,002 | 8/1978 | Rowe | 73/371 |

Primary Examiner—Gerald Goldberg
Assistant Examiner—Denis E. Corr
Attorney, Agent, or Firm—Charles L. Rowe

[57] ABSTRACT

A throwaway thermometer structure (10,110) comprising essentially a synthetic resin wall member (13,113) having a thin gas impermeable layer (11,111) defining the inner capillary bore (12,112) thereof. The outer wall member effectively defines a jacket and the inner layer effectively defines a core tube. Interlock structure (20,120) is provided for effectively accurately maintaining the longitudinal disposition of the jacket and core tube. Such maintained disposition provides effective accurate maintained disposition of a scale (17) or the like, provided on the jacket portion of the thermometer. In one form, the interlock (20) may be directly between the jacket and the core tube. In an alternate form, the interlock (120) is indirectly between the jacket and core tube, being effectively provided between the reservoir bulb (114) and the core tube (111), with the reservoir bulb being fixedly secured to the jacket. The interlock structure may further define a constricted portion (23,123) of the capillary bore for releasably preventing return of the indicator liquid to the reservoir bulb upon completion of the temperature sensing operation. The jacket may be molded in place or provided as a preformed element, as desired.

11 Claims, 3 Drawing Figures

4,229,975

THROWAWAY PLASTIC THERMOMETER STRUCTURE

TECHNICAL FIELD

This invention relates to disposable, essentially plastic thermometers wherein a column of indicating liquid expands through a capillary bore of the thermometer for cooperation with an associated scale means in providing a readout of the sensed temperature.

BACKGROUND ART

In U.S. Pat. No. 4,108,002 of Charles L. Rowe et al, a disposable thermometer is disclosed which comprises essentially a molded plastic thermometer. The thermometer utilizes a layer of gas impervious, rigid material to effectively prevent gaseous diffusion into the capillary bore of the thermometer thereby to maintain a preselected vacuum condition in the thermometer, and maintain dimensional stability thereby to maintain high accuracy in the temperature indication use thereof. The wall thickness of the core tube, as disclosed therein, is relatively small with the outer synthetic resin jacket having a substantially greater wall thickness. As an illustrative thickness, the core tube was disclosed as having a wall thickness of approximately 0.20". The patent further disclosed that the synthetic resin portion could be molded in place in forming the low cost disposable thermometer.

Additional background art may be seen in the references cited in said Rowe et al patent. Illustratively, as further background art, another related structure is disclosed in U.S. Pat. No. 2,651,203 of Anthony H. Lamb, wherein a complete glass thermometer is disposed within a tube of transparent plastic. Lamb teaches that the plastic define a housing for the thermometer rather than define the outer jacket portion of the thermometer itself.

Gerald J. Coben discloses, in U.S. Pat. No. 3,490,287, a rectal thermometer wherein a plastic coating covers the entire thermometer and bulb.

Frederick J. Margolis discloses, in U.S. Pat. No. 2,712,237, a clinical thermometer wherein a metallic tube extends into and sealingly engages the bore of the glass tube of the thermometer. The metal tube is provided with a constriction forming a part of the bore. The constriction appears in the form of an indentation upon the outer surface of the tube and the material of the glass tube effectively keys into the indentation.

DISCLOSURE OF THE INVENTION

The present invention comprehends a further improved low cost throwaway thermometer structure wherein the synthetic resin body and the thin wall core tube are provided with interlock means for locking the body against longitudinal displacement relative to the core.

The body, or jacket, may be provided with a temperature indicating scale accurately positioned thereon relative to the disposition of the miniscus of the liquid column in the thermometer with the cooperating interlock means effectively maintaining the relative positioning of the scale and indicating miniscus.

The jacket may be formed by being molded in place about the core or may be suitably preformed and installed subsequently about the core tube, as desired.

Where the jacket is defined by a separate tubular element, the jacket may be provided with preformed interlock means on its inner surface and the core tube may be provided with preformed interlock means on its outer surface to define the desired cooperating interlock means.

Alternatively, within the scope of the present invention, the jacket may be fixedly connected to the reservoir bulb of the thermometer with the reservoir bulb being interlocked to the core tube so as to effectively interlock the jacket relative to the core tube.

Additional means may be provided for locking the jacket against longitudinal displacement relative to the core tube, and in the illustrated embodiment, may comprise adhesive sealing means securing one end of the jacket to the core tube.

In the illustrated embodiment, the adhesive sealing means further is disposed to sealingly secure the reservoir bulb to the jacket and to the core tube.

The cooperating interlock means may synergistically define means for releasably preventing contraction of the indicating liquid in the capillary bore column.

In the illustrated embodiment, the interlock and contraction-prevention means comprises a constriction in the core tube outer surface and a corresponding constriction in the core tube inner surface defining the capillary bore.

Where the jacket is molded in place, the interlock means may be formed in situ in the constricted portion of the core tube.

The core tube may be formed of a suitable light-transmitting gas-impermeable rigid material, such as glass pipette stock, or the like.

The low cost throwaway thermometer structure of the present invention is extremely simple and economical of construction while yet providing the highly desirable features discussed above and being advantageously adaptable for use as a highly accurate clinical thermometer.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
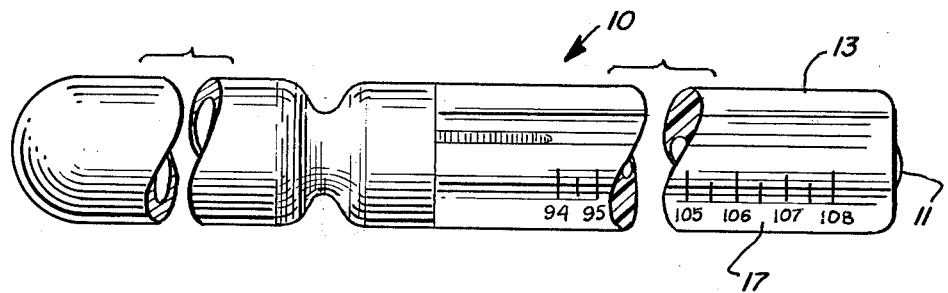
FIG. 1 is a broken side elevation of a throwaway thermometer structure embodying the invention.

In the exemplary embodiment of the invention as disclosed in the drawing, a throwaway thermometer structure generally designated 10 is shown to comprise a core tube 11 defining a capillary bore 12 and coaxially disposed within an outer tubular jacket 13 formed of a synthetic resin. A reservoir bulb 14 is provided with a body of indicating fluid 15 and is mounted to one end 16 of the composite core tube-jacket structure.

The jacket 13 is preferably formed of a light-transmitting synthetic resin, one example thereof being polypropylene, such as sold by Hercules, Inc. of Wilmington, Delaware, under the trademark, PRO-FAX 6523. The jacket may be provided with a suitable temperature indicating scale 17 which is accurately positioned on the jacket relative to the miniscus 18 defining the end of the column 19 of indicator liquid 15 in the capillary bore 12 in the normal use of the thermometer. In the illustrated embodiment, the thermometer comprises a clinical thermometer having a temperature range of approximately 94° to 108° F., it being understood that the invention is applicable to other forms of thermometers within the broad scope of the invention.

In the illustrated embodiment, the core tube 11 is formed of a light-transmitting, gas-impermeable rigid material and, illustratively, may be formed of glass. The core tube preferably has a relatively thin wall, and in the illustrated embodiment, has a wall thickness of approximately 0j.02". The thickness of the wall of jacket 13 is preferably substantially greater than the thickness of the core tube wall, and thus, as indicated above, the thermometer structure comprises essentially a synthetic resin, i.e. plastic, thermometer having a gas-impervious, stable liner defined by the core tube.

It is desirable to prevent displacement axially of the capillary bore 18 between the jacket and core tube so as to maintain the desired accurate relationship between scale 17 and the indicator liquid miniscus 18 in the use of the thermometer.

In one form, the invention comprehends the provision of such displacement preventing means comprising cooperating means 20 on the core tube 11 and jacket 13 effectively interlocking the jacket against longitudinal displacement relative to the core tube. In the illustrated embodiment, the interlock means defines a recess portion 21 in the outer surface of the core tube and a complementary radially inwardly projecting portion 22 in the jacket 13. Where the jacket is formed as a molded-in-place jacket, the projection 22 is formed in situ in the preformed constrictive recess 21. Where the jacket is preformed as a tubular jacket, it may be provided with a suitable radially inwardly extending projection 22 to be received in the recess 21 when the jacket is installed on the core tube, as shown in FIG. 2.

Figure 2:
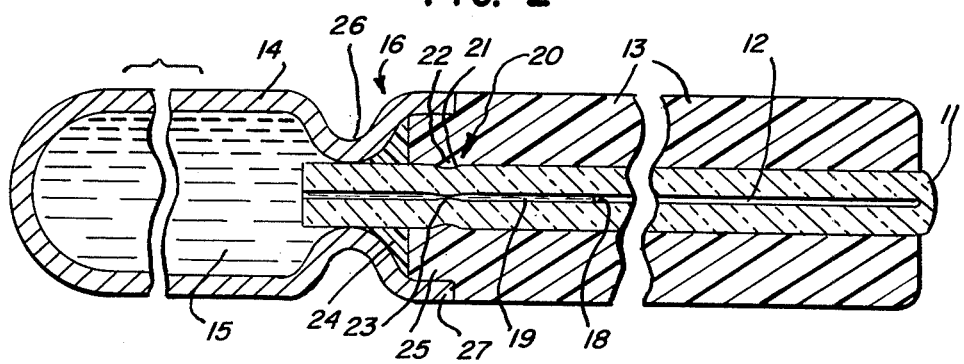
FIG. 2 is a broken diametric section thereof.

As further shown in FIG. 2, the recess 21 may comprise a constricted portion of the core tube which further defines a radially inwardly constricted portion 23 of the capillary bore 12 radially inwardly of the recess 21. The constriction 23 effectively defines means for releasably preventing return of the indicator liquid to the reservoir bulb 15 upon cooling of the liquid as upon removal from association with the patient.

The invention alternatively comprehends the provision of means for preventing displacement of jacket 13 relative to core tube 11 in the form of a body of sealing adhesive 24 sealingly bonding a portion of the jacket, such as end 25 of the jacket, to the outer surface of the core tube. Such adhesive displacement preventing means may be supplemental to the interlock means within the scope of the invention.

As further shown in FIG. 2, reservoir bulb 14 may be provided with a constricted portion 26 engaging the outer surface of the core tube. The reservoir bulb may include an end portion 27 fitted onto the end 25 of jacket 13. Thus, the jacket may be further, or alternatively, locked against longitudinal displacement relative to the core tube by the connection thereof through the reservoir bulb portion 27 and constricted portion 26 to the core tube directly as well as by means of the adhesive 24 between the reservoir bulb end portion 27 and the core tube.

Thus, as shown in FIG. 2, a plurality of means may be selectively or conjointly provided for effectively assuring the prevention of longitudinal displacement of the jacket 13 relative to the core tube for effectively assuring maintained accurate alignment of scale 17 with the indicator liquid readout miniscus and thereby providing maintained high accuracy in the use of the improved thermometer construction.

Figure 3:
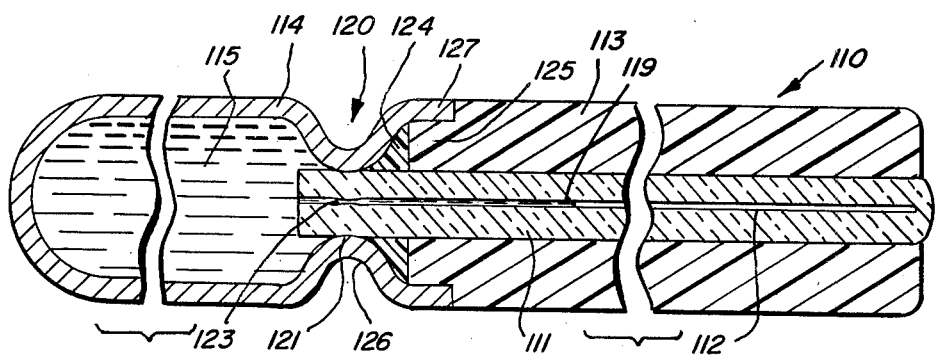
FIG. 3 is a broken diametric section of a modified form of throwaway thermometer structure embodying the invention.

Referring now to the embodiment of FIG. 3, a further modified form of thermometer structure generally designated 110 is shown to comprise a thermometer structure similar to illustrated thermometer structure 10 but wherein the interlock means 120 comprises a constricted portion 126 of the reservoir bulb received in a recess 121 of the core tube. The recess 121 may define a constricted portion of the core tube further defining a constriction portion 123 in the capillary bore 112 radially inwardly of the constricted portion 126 of the reservoir bulb.

Jacket 113 is locked against longitudinal displacement relative to the core tube 111 by the connection of the reservoir bulb end 127 to the jacket end portion 125 and by the adhesive bonding means 124 sealingly bonding both the reservoir bulb and jacket to the core tube.

Thus, thermometer structure 110 is generally similar to thermometer structure 10 and functions in a similar manner to effectively assure prevention of longitudinal displacement of the jacket relative to the core tube and to provide releasable means for preventing displacement of the indicating liquid readout miniscus upon completion of a temperature sensing operation.

The interlock and constriction means of the different embodiments may be fully annular about the axis of the core tube within the scope of the invention. Alternatively, as will be obvious to those skilled in the art, they may be provided as one or more localized recess and/or constriction portions of the thermometer structure as desired.

One advantageous material for the glass core comprises glass tubing manufactured by Accu-Glass of St. Louis, Missouri, a division of Becton, Dickinson and Company. Such tubing is formed of soda lime glass permitting facilitated thermal constriction for defining the constricted portion 23. The capillary bore diameter in such glass tubing may be preselected to be within the range of approximately 0.002" to 0.120" as desired, with the cross section of the bore having maximum variation over the length thereof.

As is conventional in thermometer manufacture, the midportion 28 of the scale 27 may be located accurately in correspondence with the miniscus 18 at that temperature so as to minimize tolerance variations in the bore relative to the accuracy of the thermometer.

Thus, the invention comprehends an essentially synthetic resin thermometer provided with a gas impermeable layer defining an accurate capillary bore thereof and having improved means for effectively maintaining a desired accurate longitudinal disposition of the jacket relative to the core tube layer and preventing undesirable change in the calibration of the thermometer making the thermometer highly advantageously adaptable for use as a disposable maintained accurate clinical thermometer.

INDUSTRIAL APPLICABILITY

The thermometer structure of the present invention may be embodied in any form of thermometer structure utilizing an expandable indicator liquid and a scale as the cooperating indicating means. While the invention has been described in connection with a clinical thermometer, as will be obvious to those skilled in the art, it is applicable equally well to conventional household thermometers, industrial thermometers, and the like.

As the interlocking of the synthetic resin jacket to the thin wall core tube maintains the desired accurate relationship between the indicator liquid level and scale, the thermometer provides high accuracy suitable for all uses including one-time, or disposable, clinical use.

The foregoing disclosure of specific embodiments is illustrative of the broad inventive concepts comprehended by the invention.

I claim:

1. In a throwaway thermometer structure (10,110) having a thin wall tubular light-transmitting, gas impermeable core (11,111) defining a capillary bore (12,112) containing a column (19,119) of thermally expandable indicator liquid (15,115), an outer tubular light-transmitting jacket (13,113) formed of molded synthetic resin and provided with a temperature indicating scale (17), and a reservoir bulb (14,114) for the liquid at one end of the core, the improvement comprising:

cooperating interlock means on said core and jacket spaced from and adjacent said reservoir bulb defining a radially directed interlock (20,120) for locking said jacket (13,113) against longitudinal displacement relative to said core (11,111), said interlock means (20) including an annular groove (21) in the outer wall of said core and an annular projection (22) on said jacket (13) extending into said groove; and securing means for locking the reservoir bulb to the locked jacket.

2. The thermometer structure (10,110) of claim 1 wherein said temperature indicating scale (17) is accurately centered relative to the disposition of the top (18) of the liquid column (19,119) at a preselected temperature, said interlock means (20,120) effectively maintaining said relative centering of said scale.

3. The thermometer structure (10,110) of claim 1 wherein said core defines a constricted portion of the bore and said interlock means (20,120) extends annularly about said constricted portion of the core (11,111).

4. In a throwaway thermometer structure (10,110) having a thin wall tubular light-transmitting, gas impermeable core (11,111) defining a capillary bore (12,112) containing a column (19,119) of thermally expandable indicator liquid (15,115), and outer tubular light-transmitting jacket (13,113) formed of molded synthetic resin and provided with a temperature indicating scale (17), and a reservoir bulb (14,114) for the liquid at one end of the core, the improvement comprising:

cooperating means on said core and said jacket spaced from and adjacent said reservoir bulb defining a radially directed interlock (20,120) for locking said jacket (13,113) against longitudinal displacement relative to said core, said cooperating interlock means further defining means (23,123) for releasably preventing contraction of the indicating liquid (15,115) in said column (19,119), said interlock means (20) including an annular groove (21) in the outer wall of said core and an annular projection (22) on said jacket (13) extending into said groove; and securing means for locking the reservoir bulb to the locked jacket.

5. The thermometer structure of claim 4 wherein said interlock means (20) comprises a preformed annular constriction (21) of the core (11) and an annular molded-in-place radial projection (22) in said jacket.

6. The thermometer structure of claim 4 wherein said interlock means (20,120) is rounded in cross section.

7. The thermometer structure of claim 4 wherein said interlock means (20,120) extends annularly coaxially of said core and is rounded in transverse cross section.

8. The thermometer structure of claim 4 wherein said interlock means (20,120) includes a thermally deformed portion of said core.

9. The thermometer structure of claim 4 wherein said reservoir bulb (14) defines means for restraining longitudinal displacement of the jacket relative to the core.

10. The thermometer structure of claim 4 wherein said reservoir bulb (114) is secured to one end of the core and jacket, said bulb being constricted about an annular portion (121) of said core one end to define cooperating interlock means, said annular portion (121) of the core end being constricted to define said means for releasably preventing contraction of the indicating liquid (15,115) in said column (19,119).

11. The thermometer structure of claim 4 wherein said core (11,111) is formed of glass.

* * * * *